No. 839,224.

PATENTED DEC. 25, 1906.

H. STOKES.

COUPLING DEVICE FOR ELECTRIC CONDUCTORS.

APPLICATION FILED FEB. 5, 1906.

2 SHEETS—SHEET 1.

Witnesses,
E. D Barted.
Walter G. H.

Inventor,
Harold Stokes.
per Herbert Sefton Jones
Attorney

No. 839,224. PATENTED DEC. 25, 1906.
H. STOKES.
COUPLING DEVICE FOR ELECTRIC CONDUCTORS.
APPLICATION FILED FEB. 5, 1906.

2 SHEETS—SHEET 2.

Witnesses

Inventor
Harold Stokes
per Herbert Sefton
Attorney

UNITED STATES PATENT OFFICE.

HAROLD STOKES, OF LONDON, ENGLAND.

COUPLING DEVICE FOR ELECTRIC CONDUCTORS.

No. 839,224.

Specification of Letters Patent.

Patented Dec. 25, 1906.

Application filed February 5, 1906. Serial No. 299,526.

*To all whom it may concern:*

Be it known that I, HAROLD STOKES, electrical engineer, a subject of the King of Great Britain, and a resident of 76 Ellerby street, Fulham Park, London, England, have invented new and useful Improvements in Coupling Devices for Electric Conductors, of which the following is a specification.

This invention relates to couplings for connecting together electric wires and facilitating their rapid disconnection.

According to this invention the couplings are such that tappings can be taken from them for other conductors without interference with the principal circuit connections. The arrangement in accordance with the invention is especially applicable for use in cases where electric circuits are required to be set up quickly and safely and to be removed again without loss of or damage to the materials used.

The invention is illustrated in the accompanying drawings, in which—

Figure 2:
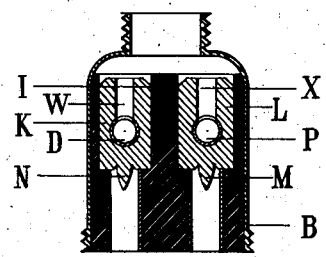
Figure 3:
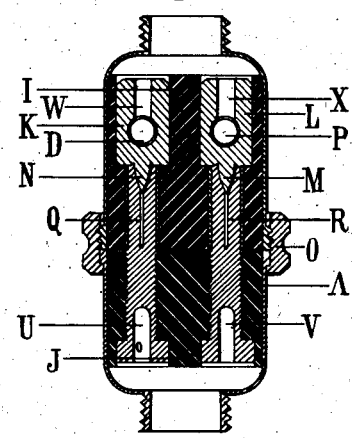
Figure 1:
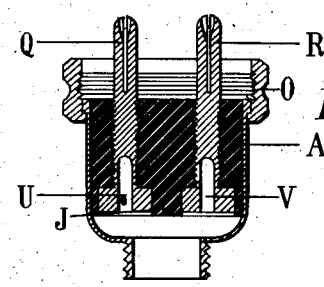
Figure 4:
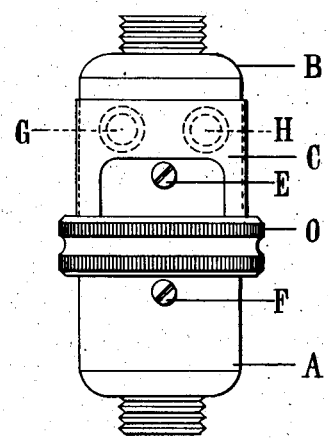
Figure 5:
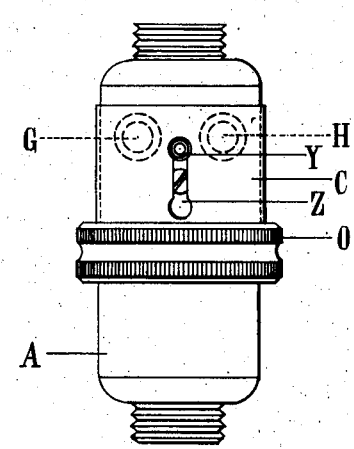
Figure 6:
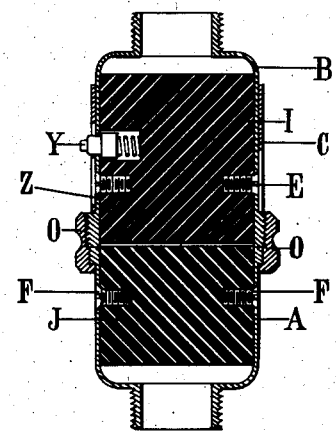

Figures 1 and 2 show sections through the two principal parts of the coupling. Fig. 3 is a similar section showing the parts connected together. Figs. 4 and 5 show the closed coupling in elevation as seen from two opposite sides thereof. Fig. 6 is a section by a plane at right angles to the plane of section of Figs. 1, 2, and 3.

In making the coupling in accordance with this invention I prepare two blocks of vulcanite or other suitable insulating material, which may be of cylindrical form or any shape suitable, and in the first block J (shown in section in Fig. 1) metal male plugs Q and R are inserted, which are split at the exposed ends and a small taper-hole drilled in the end of each. At the other ends holes are drilled, (shown at U and V,) with set-screws at side forming terminals to connect electric wires. Each of these metal plugs is kept insulated from the other.

In the second insulator-block I (shown in section in Fig. 2) metal female sockets K and L are inserted, of such a size as to fit over the male plugs Q and R in Fig. 1. At the bottom of sockets K and L tapered metal pins N' and M are fixed, which fit into the small holes at the end of the male plugs and spread them apart, causing them to make a tight electrical connection by pressing against the sides of the interiors of the female sockets. At the other end holes are drilled, (shown at W and X,) with set-screws at side forming terminals to connect electric wires. D and P are two other female sockets fixed at right angles and carried through sockets K and L and arranged so that an ordinary pin-plug can be inserted at each end, thus making a two-way plug.

Fig. 3 is a section of the combined electric coupling and two-way plug, showing arrangement of parts when in use.

Fig. 4 shows the combined electric coupling and two-way plug in case complete. The dotted lines G and H indicate holes in the case for pushing in the side plug, and C is a sliding cover to protect the side plug-holes when not in use. E and F are screws to hold interiors in position, as shown in Fig. 6. O is an ordinary screw-ring coupling to fasten the two parts of the metal case A and B together and at the same time to hold the sockets and plugs firmly in position and complete the metallic continuity of tubing or sheathing which may be screwed onto the ends of the casings A and B and in which the cable may be laid.

Fig. 5 shows the reverse side of Fig. 4. Y is a spring-plunger, (seen in section in Fig. 6,) and Z is a slot in cover C, in which the head of plunger Y engages in order to prevent the cover C from turning round or coming off. By pressing Y the cover can be slid up and down, as required. The dotted lines indicate the other end of G and H in Fig. 4.

What I claim is—

1. In a coupling for electric conductors the combination of two casings with means for attaching them together and with the insulating-blocks in said casings, of split plugs fixed in one coupling part and plug-sockets fixed in the other coupling part, said plug-sockets including pins adapted to spread the split plugs against the walls of the plug-sockets when the parts are forced together.

2. In a coupling for electric conductors the combination of a pair of metallic casings and pairs of connecting-plugs with insulating material adapted to support them in said casings, the one casing having a pair of transverse holes bored therein through the walls of the casing, the insulation and metallic plugs, whereby accommodation is provided for inserting a plug for making a branch electrical connection.

3. In an electric coupling the combination of two metallic casings, electric connecting-plugs, and insulation supporting said plugs in said casings, the one pair of plugs being formed with transverse plug-sockets to which access is given from outside through holes in the casing and in the insulation, and means for locking the two parts of the casing together.

4. In an electric coupling the combination of two metallic casings, electric connecting-plugs and insulation supporting said plugs in said casings, the one pair of plugs being formed with transverse plug-sockets to which access is given from outside through holes in the casing and in the insulation, a cover for the transverse plug-sockets, means for holding said cover in either an open or a closed position, and means for locking the two parts of the casing together.

In testimony whereof I have signed my name to this specification in the presence of two subscribing witnesses.

HAROLD STOKES.

Witnesses:
JNO. C. SIMMONDS,
H. D. JAMESON.